Inventor
Kinji Ishii

United States Patent Office 3,182,500
Patented May 11, 1965

3,182,500
ROTAMETER TRANSMITTER
Kinji Ishii, Musashino-chi, Tokyo, Japan, assignor to Kabushikikaisha Yokogawa Denki Seisakusho (Yokogawa Electric Works Ltd.), Tokyo, Japan, a corporation of Japan
Filed Feb. 28, 1962, Ser. No. 176,270
Claims priority, application Japan, Mar. 6, 1961, 36/11,073, 36/11,074
6 Claims. (Cl. 73—209)

This invention relates to rotameter transmitters having a wide measuring range.

One object of this invention is to provide a rotameter transmitter which enables one with accuracy to measure a comparatively small flow rate of fluid.

Another object of this invention is to provide a rotameter transmitter which can measure a large flow rate without considerable limitation.

A further object of this invention is to provide a rotameter transmitter in which a comparatively wide range of flow rate can be measured without difficulty.

Figure 1:
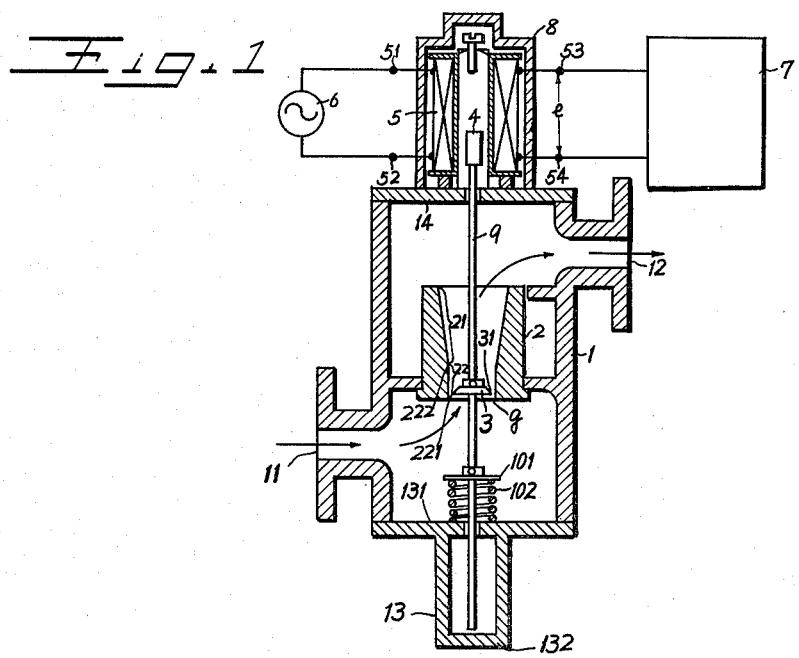
Figure 2:
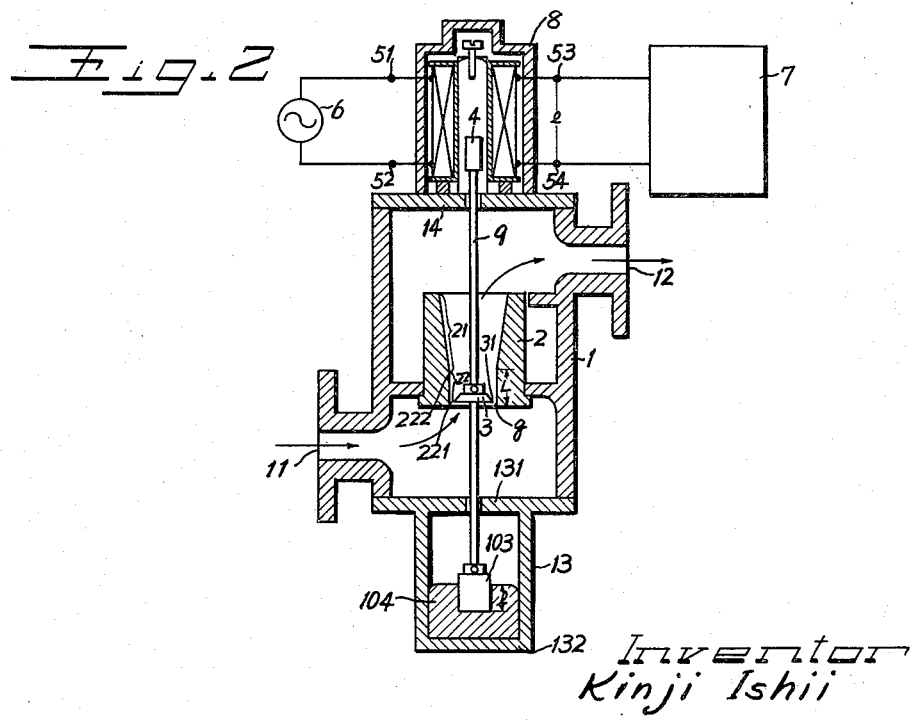

Other objects, features and advantages of this invention will become fully apparent from the following description taken in conjunction with the accompanying drawing, in which:

FIGURE 1 is a longitudinal cross sectional view illustrating an embodiment of a rotameter transmitter of this invention, and FIGURE 2 is also a longitudinal cross sectional view illustrating another embodiment of the rotameter transmitter of this invention.

In FIG. 1, 1 is a transmitter housing provided with a flow inlet 11, a flow outlet 12 and a box 13 at the bottom and 2 is an upright tapered tube, disposed in the housing 1. The tube 2 has a passageway formed therein and the upper portion 21 of the inner wall of this tube 2 is formed with upwardly increasing diameter, the lower portion 22 thereof being with substantially a constant diameter. Therefore, the cross-sectional area of the upper portion is greater than the cross-sectional area of the bottom portion. 3 is a roundish float which is lifted by the fluid flowing through the tube 2, 4 a movable iron core cooperating with the float 3, 5 a coil surrounding the movable iron core 4, 6 an A.C. power source connected across input terminals 51 and 52, 7 an external circuit connected across output terminals 53 and 54 of the coil 5 and for measuring voltages thereacross, and 8 a cover for the coil 5. The aforementioned movable iron core 4 and float 3 are fixed for mutually axial displacement on a rod 9 which is slidably carried by the housing 1 so that a voltage $e$ may be generated at the output terminals of the coil 5 in accordance with the displacement of the float 3 from its standard position. 101 is a disc fixed on the lower part of the rod 9 and 102 is a force imposing means operative to exert an upward force on the rod 9 which varies as a function of the axial displacement thereof and which, in the embodiment illustrated in FIGURE 1, constitutes a helical compression spring the lower end of which is fixed on an upper wall 131 of the box 13. This spring 102 is formed in such a way that while the standard plane or fluid impingement surface 31 of the float 3 (for example, its lower plane) stays within the lower portion 22 of the tube 2, the spring pushes the disc 101 upwardly and that when the standard plane or fluid impingement surface 31 goes beyond the upper edge 222 of the lower portion 22 the spring touches the disc 101 no longer. When the flow rate of the liquid is zero the weight of the float 3 and the upward force applied by the spring 102 pushing up the disc 101 are in an equilibrium and the float 3 is held at the standard position.

In the device constructed as described above, fluid from the inlet 11 is drained out passing through the tube 2. Since this fluid flows through an annular gap $g$ formed between the inner wall of the tube 2 and the circumference of the float 3, differential pressure is caused above and below the float according to the flow rate of the liquid and said float is displaced upwardly with this differential pressure.

In this case, while the standard plane 31 of the float 3 stays within the lower part 22 of the tube 2, the float 3 stands still at the position where the downward force of said float supported by the spring 102 and said differential pressure equilibrate, and when the standard plane 31 goes up to the upper tapered part 21 the float 3 is held at the position where the weight of the float and the differential pressure equilibrate.

The above description has been made in connection with a case where the spring 102 is fixed on the upper wall 131 of the box 13. But it is not always necessary to fix the spring on said upper wall 131 and it can be mounted on the other wall of the housing (for instance, on the upper wall 14 or lower one 132) or on the fixed parts provided on the housing.

FIGURE 2 is a longitudinal cross sectional view illustrating another embodiment of this invention. In this example, another spring or force imposing means operative to exert an upward force on the rod 9 which varies as a function of the axial displacement thereof, is illustrated, and which constitutes, in this embodiment of the invention, a second float 103 is fixed on the lower end of the rod 9, and a medium of liquid state 104 in which the aforesaid second float is immersed is stored in the box 13. As this medium 104, it is preferable to use a material of as large specific gravity as possible, such, for example, as mercury. When mercury is used the float 103 made of, for example, stainless steel is favorable to employ. This float 103 is formed in such a manner that when the standard plane 31 of the first float 3 is at its standard position the length $l$ of that part of the float 103 which is immersed in the medium 104 corresponds substantially to the length $L$ from the standard position of said first float 3 to the upper edge 222 of the lower part 22 of the tube 2. When the standard plane 31 of the first float 3 goes over the upper edge 222 of the lower part 22 the second float 103 is lifted out from the medium 104. The size (the volume) of this float 103 is so selected that when the flow rate of a fluid to be measured is zero the float 3 is held at its standard position due to the buoyance applied to said float 103.

In the device of this embodiment, while the standard plane 31 of said float 3 stays within the lower part 22 of the tube 2 the first float 3 stands at the position where the weight subtracting the upward supporting force due to the buoyance of the second float 103 from the weight of the float 3 and the differential pressure caused by the fluid to be measured above and below the first float equilibrate. When the first float 3 goes up to the tapered portion 21 it is held at the position where the weight of the first float 3 plus that of the second float 103 and said differential pressure equilibrate.

In this kind of the device heretofore used, it has not such a spring or second float as described above, so with heavier float 3 the measurement of a small flow rate is difficult, and with a lighter float that of a large flow rate is considerably limited. That is, such conventional devices have disadvantages in that their measuring range is small. In the device of this invention, however, at the time of a small flow rate the spring or second float acts as if the first float becomes lighter and at the time of a large flow rate the spring ceases its action or the second float acts in such a manner that the first float becomes heavier than its weight.

Thus, the device of this invention has the same effects as those of a device having a float 3 whose weight varies

What is claimed is:
1. A rotameter transmitter comprising,
a housing having a fluid inlet and a fluid outlet,
means defining a flow passageway in said housing interposed between said inlet and said outlet,
said passageway having a lower portion and an upper portion having a cross-sectional area greater than said lower portion,
a rod member slidably carried in said housing and extending into said passageway,
a float member situated in said passageway and connected to said rod for axial movement therewith,
said float having a fluid impingement surface for receiving impinging fluid flowing through said passageway and for displacing said float and said rod as a function of the rate of fluid flow through said passageway,
means coacting with said rod and responsive to the position of said float and operative to indicate rate of flow through said passageway, and
means operative on said rod for exerting an upward force on said rod only when said fluid impingement surface is in said lower portion of said passageway.

2. A rotameter transmitter comprising,
a housing having a fluid inlet and a fluid outlet,
means defining a flow passageway in said housing interposed between said inlet and said outlet,
said passageway having a lower portion and an upper portion having a cross-sectional area greater than said lower portion,
a rod member slidably carried in said housing and extending into said passageway,
a float member situated in said passageway and connected to said rod for axial movement therewith,
said float having a fluid impingement surface for receiving impinging fluid flowing through said passageway and for displacing said float and said rod as a function of the rate of fluid float through said passageway,
means coacting with said rod and responsive to the position of said float and operative to indicate rate of flow through said passageway, and
force imposing means operative on said rod for exerting an upward force on said rod which varies as a function of the axial displacement of said rod,
said force imposing means being operative only when said fluid impingement surface is in said lower portion of said passageway.

3. A rotameter transmitter comprising,
a housing having a fluid inlet and a fluid outlet,
means defining a flow passageway in said housing interposed between said inlet and said outlet,
said passageway having a lower portion and an upper portion,
said upper portion having an upwardly-increasing cross-sectional area which is greater than the cross-sectional area of said lower portion,
a rod member slidably carried in said housing and extending into said passageway,
a float member situated in said passageway and connected to said rod for axial movement therewith,
said float having a fluid impingement surface for receiving impinging fluid flowing through said passageway and for displacing said float and said rod as a function of the rate of fluid flow through said passageway,
means coacting with said rod and responsive to the position of said float and operative to indicate rate of flow through said passageway, and
means operative on said rod for exerting an upward force on said rod only when said fluid impingement surface is in said lower portion of said passageway.

4. A rotameter transmitter comprising,
a housing having a fluid inlet and a fluid outlet,
means defining a flow passageway in said housing interposed between said inlet and said outlet,
said passageway having a lower portion and an upper portion,
said upper portion having an upwardly-increasing cross-sectional area which is greater than the cross-sectional area of said lower portion,
a rod member slidably carried in said housing and extending into said passageway,
a float member situated in said passageway and connected to said rod for axial movement therewith,
said float having a fluid impingement surface for receiving impinging fluid flowing through said passageway and for displacing said float and said rod as a function of the rate of fluid flow through said passageway,
means coacting with said rod and responsive to the position of said float and operative to indicate rate of flow through said passageway, and
means operative on said rod to provide a first effective weight of said rod when said impingement surface is in said upper portion and to provide a second effective weight of said rod when said impingement surface is in said lower portion.

5. A rotameter transmitter comprising,
a housing having a fluid inlet and a fluid outlet,
means defining a flow passageway in said housing interposed between said inlet and said outlet,
said passageway having a lower portion and an upper portion,
said lower portion having a constant cross-sectional area and said upper portion having an upwardly-increasing cross-sectional area which is greater than the cross-sectional area of said lower portion,
a rod member slidably carried in said housing and extending into said passageway,
a float member situated in said passageway and connected to said rod for axial movement therewith,
said float having a fluid impingement surface for receiving impinging fluid flowing through said passageway and for displacing said float and said rod as a function of the rate of fluid flow through said passageway,
means coacting with said rod and responsive to the position of said float and operative to indicate rate of flow through said passageway, and
a compression spring in said housing and acting on said rod to urge said rod upwardly only when said fluid impingement surface is in said lower portion.

6. A rotameter transmitter comprising,
a housing having a first fluid inlet and a first fluid outlet and a box member for confining a quantity of a second fluid,
means defining a flow passageway in said housing interposed between said inlet and said outlet,
said passageway having a lower portion and an upper portion,
said lower portion having a constant cross-sectional area and said upper portion having an upwardly-increasing cross-sectional area which is greater than the cross-sectional area of said lower portion,
a rod member slidably carried in said housing and extending into said passageway, a first float member situated in said passageway and connected to said rod for axial movement therewith, said first float having a fluid impingement surface for receiving impinging fluid flowing through said passageway and for displacing said float and said rod as a function of the rate of fluid flow through said passageway, means coacting with said rod and responsive to the position of said float and operative to indicate rate of flow through said passageway, and a second float number connected to said rod for axial movement therewith, said second float member being arranged relative to said box member such that the second fluid in the box member produces a buoyant effect on said second float member only when said fluid impingement surface is in said lower portion.

References Cited by the Examiner

UNITED STATES PATENTS

| | | | |
|---|---|---|---|
| 2,073,372 | 3/57 | Heidbrenk | 73—209 |
| 2,552,552 | 5/51 | Head | 73—209 |
| 2,755,664 | 7/56 | Chapman | 73—209 |

OTHER REFERENCES

German printed application, B 20,431/42e, 3/56.

RICHARD C. QUEISSER, *Primary Examiner.*

ROBERT EVANS, *Examiner.*